United States Patent
Sing et al.

(10) Patent No.: US 12,551,084 B2
(45) Date of Patent: Feb. 17, 2026

(54) DOMESTIC APPLIANCE

(71) Applicant: BSH Hausgeräte GmbH, Munich (DE)

(72) Inventors: Alexander Sing, Wittislingen (DE); Sami Bisgin, Dillingen (DE); Michael Fickler, Augsburg (DE); Maximilian Hessel, Munich (DE)

(73) Assignee: BSH Hausgeräte GmbH, Munich (DE)

( * ) Notice: Subject to any disclaimer, the term of this patent is extended or adjusted under 35 U.S.C. 154(b) by 671 days.

(21) Appl. No.: 17/912,875

(22) PCT Filed: Mar. 11, 2021

(86) PCT No.: PCT/EP2021/056165
§ 371 (c)(1),
(2) Date: Sep. 20, 2022

(87) PCT Pub. No.: WO2021/197791
PCT Pub. Date: Oct. 7, 2021

(65) Prior Publication Data
US 2023/0141204 A1    May 11, 2023

(30) Foreign Application Priority Data
Mar. 30, 2020 (DE) .......................... 102020204086.9

(51) Int. Cl.
| | |
|---|---|
| *A47L 15/42* | (2006.01) |
| *B32B 5/18* | (2006.01) |
| *B32B 15/04* | (2006.01) |
| *B32B 15/095* | (2006.01) |
| *D06F 39/12* | (2006.01) |

(52) U.S. Cl.
CPC ............ *A47L 15/4209* (2016.11); *B32B 5/18* (2013.01); *B32B 15/046* (2013.01); *B32B 15/095* (2013.01); *A47L 15/4246* (2013.01); *B32B 2250/02* (2013.01); *B32B 2260/02* (2013.01); *B32B 2266/0278* (2013.01); *B32B 2307/102* (2013.01); *B32B 2307/304* (2013.01); *B32B 2307/56* (2013.01); *B32B 2307/72* (2013.01); *B32B 2307/728* (2013.01); *B32B 2509/00* (2013.01)

(58) Field of Classification Search
CPC . A47L 15/4209; B32B 5/18; B29L 2031/762; B29K 207/00
See application file for complete search history.

(56) References Cited

U.S. PATENT DOCUMENTS

| | | | |
|---|---|---|---|
| 6,766,596 B1 * | 7/2004 | Bienick | D06F 39/14 68/12.01 |
| 10,010,237 B1 | 7/2018 | Dirisala | |
| 10,165,856 B2 | 1/2019 | Gleixner | |
| 2005/0028850 A1 | 2/2005 | Nito | |
| 2011/0168217 A1 | 7/2011 | Neff | |
| 2013/0193826 A1 | 8/2013 | Fritz | |
| 2015/0017360 A1 * | 1/2015 | Krupicka | A47L 15/4209 428/318.6 |
| 2018/0049618 A1 | 2/2018 | Lista | |
| 2018/0368653 A1 | 12/2018 | Dirisala | |
| 2023/0165428 A1 * | 6/2023 | Sing | A47L 15/4209 312/400 |
| 2023/0172420 A1 * | 6/2023 | Sing | B32B 5/18 312/400 |

FOREIGN PATENT DOCUMENTS

| | | |
|---|---|---|
| CN | 104895472 A | 9/2015 |
| DE | 10118632 A1 | 10/2002 |
| DE | 102008030539 A1 | 12/2009 |
| DE | 102012201244 A1 | 8/2013 |
| EP | 3092935 A1 | 11/2016 |
| JP | 2007044919 A | 2/2007 |
| JP | 2011167426 A | 9/2011 |
| KR | 20030017684 A | 3/2003 |

OTHER PUBLICATIONS

National Search Report DE 102020204086.9 dated Dec. 21, 2020.
International Search Report PCT/EP2021/056165 dated Apr. 21, 2021.
National Search Report CN 202180026125X dated Mar. 20, 2025.
National Search Report CN 202180026125X dated Nov. 22, 2025.

* cited by examiner

*Primary Examiner* — Melissa A Rioja
(74) *Attorney, Agent, or Firm* — Michael E. Tschupp; Andre Pallapies; Brandon G. Braun

(57) ABSTRACT

A household appliance includes a receiving region and an insulation element attached to the receiving region for acoustic and/or thermal insulation of the receiving region. The insulation element is manufactured from a viscoelastic polyurethane foam and pressed against the receiving region in such a manner that the insulation element is sealed off in relation to the receiving region in a fluid-tight manner.

10 Claims, 10 Drawing Sheets

DOMESTIC APPLIANCE

CROSS-REFERENCES TO RELATED APPLICATIONS

This application is the U.S. National Stage of International Application No. PCT/EP2021/056165, filed Mar. 11, 2021, which designated the United States and has been published as International Publication No. WO 2021/197791 A1 and which claims the priority of German Patent Application, Serial No. 10 2020 204 086.9, filed Mar. 30, 2020, pursuant to 35 U.S.C. 119(a)-(d).

The contents of International Application No. PCT/EP2021/056165 and German Patent Application, Serial No. 10 2020 204 086.9 are incorporated herein by reference in their entireties as if fully set forth herein.

BACKGROUND OF THE INVENTION

The present invention relates to a household appliance, in particular a water-guiding household appliance.

In household dishwashers, there are regions which are to be protected from a non-permissible escape of steam or escape of water out from a dishwasher cavity of the household dishwasher. To this end, according to in-house findings of the applicant, it is possible to use seals manufactured from rubber. Furthermore, non-woven materials, plastics or foam parts may also be used, in order to guide the escape of steam in a controlled manner. These are mostly premanufactured structural parts or assembly groups, which are attached to the dishwasher cavity at the corresponding points.

The publication EP 3 092 935 A1 discloses an arrangement for the acoustic and thermal insulation of a receiving region of a water-guiding household appliance. The arrangement comprises a first insulation element, which is configured to thermally insulate a receiving region, and a second insulation element, which is configured to acoustically insulate the receiving region, wherein the first insulation element is arranged between the receiving region and the second insulation element. In this context, the first insulation element is directly foamed onto the receiving region.

BRIEF SUMMARY OF THE INVENTION

Against this background an object of the present invention consists in providing an improved household appliance.

A household appliance, in particular a water-guiding household appliance, is accordingly proposed. The household appliance comprises a receiving region and an insulation element attached to the receiving region for the acoustic and/or thermal insulation of the receiving region, wherein the insulation element is manufactured from a viscoelastic polyurethane foam and wherein the insulation element is pressed against the receiving region in such a manner that the insulation element is sealed off in relation to the receiving region in a fluid-tight manner.

This means that the insulation element is able to fulfill a dual function, namely the acoustic and/or thermal insulation of the receiving region and the prevention of an undesired escape of steam between the insulation element and the receiving region.

The household appliance may be a household dishwasher. The household appliance may also, however, be a household washing machine or any other given household appliance, such as a refrigerator, a stove, an oven or the like, for example. In particular, the receiving region has the shape of a cuboid or cube and comprises a base, a ceiling arranged opposite the base, two side walls arranged opposite one another, a door hinged on the receiving region in a pivotable manner as well as a rear wall arranged opposite the closed door. In particular, the receiving region may be a dishwasher cavity for receiving items to be washed.

The insulation element may be provided on the base, on the ceiling, on the side walls, on the rear wall and/or on the door. To this end, a plurality of insulation elements may be provided. The insulation element may also, however, be embodied in such a manner that it fully envelops the receiving region with the exception of the door. Alternatively, the insulation element may also, for example, only be arranged on the side walls, only on the rear wall and/or only on the ceiling of the receiving region. In particular, the insulation element is suitable for converting structure-borne sound into heat. This means that the acoustic insulation properties of the insulation element are achieved. The insulation element, however, also has thermal insulation properties or thermal damping properties.

The polyurethane foam preferably comprises a large number of cells, pores or cavities embodied in a matrix material. The pores are preferably filled with air. The pores are preferably open-pored or open-celled. This means that the pores are connected to one another. In this case, the polyurethane foam is in particular in the form of a sponge, whereby it is able to absorb a particularly large amount of moisture. The pores, however, may also be closed-pored or closed-celled. The polyurethane foam is produced by the mixing and foaming up of at least two raw components, namely a polyol and an isocyanate. The raw components may also comprise a propellant. By mixing the raw components in combination with the propellant, the polyurethane foam can be produced by way of a chemical reaction of the raw components with one another.

In the present case, "viscoelasticity" is to be understood as meaning a partially elastic, partially viscous material behavior. Viscoelastic substances therefore combine the features of solids and liquids. Preferably, the insulation element is elastically deformed or compressed by the pressing of the same against the receiving region. Due to a restoring force of the insulation element, which is able to bring it from its deformed state into a non-deformed state, said insulation element is pressed against the receiving region in a fixed manner. This means that preferably no fluid, in particular no liquid, is able to pass through between the insulation element and the receiving region.

In accordance with one embodiment, at 40° C. and at a frequency of 100 to 800 Hz, the polyurethane foam has a loss factor of more than 0.2, preferably of more than 0.35, further preferably of more than 0.5.

This means that an effective sound-deadening of the receiving region or an acoustic damping of vibrations of the receiving region is achieved. In the present case, the "loss factor" is to be understood as meaning, in the case of physical vibrations that have different natures, the ratio of the imaginary part subject to loss to the loss-free real part of a complex variable. The loss factor can be adapted to the respective field of application, i.e. to a defined temperature and frequency range, with the aid of particles embedded in the matrix material.

In accordance with a further embodiment, the polyurethane foam has a thermal conductivity between 20 and 80 mW (m*K), preferably between 40 and 60 mW (m*K), further preferably between 50 and 60 mW (m*K).

This means that it is ensured that the insulation element has good thermal insulation properties or damping properties.

In accordance with a further embodiment, the polyurethane foam has a density of less than 300 kg/m³, preferably of less than 250 kg/m³, further preferably of less than 200 kg/m³.

The density of the polyurethane foam can be chosen arbitrarily, however. The lower the density, the lower the proportion of matrix material and the greater the proportion of pores embedded in the matrix material.

In accordance with a further embodiment, the insulation element has an elastically deformable sealing lip, which is pressed against the receiving region, in order to seal off the insulation element in relation to the receiving region in a fluid-tight manner.

The insulation element may comprise any given number of sealing lips. Preferably, the sealing lip is formed from the polyurethane foam. When the insulation element is pressed against the receiving region, the sealing lip elastically deforms and presses against the receiving region. This means that the fluid-tight sealing is maintained over the entire service life of the household appliance, even if the polyurethane foam contracts.

In accordance with a further embodiment, the polyurethane foam is hydrophilic.

"Hydrophilic" means "receptive to water". This means that the polyurethane foam absorbs water vapor or water. Preferably, the polyurethane foam is open-celled, meaning that it is able to absorb as much water as possible.

In accordance with a further embodiment, the polyurethane foam absorbs water during a program sequence of the household appliance and releases the water again toward the end of the program sequence.

The program sequence may be a washing program of a household dishwasher, for example. The polyurethane foam is able to release the water, for example, by heat being introduced into the polyurethane foam. The polyurethane foam also releases water to the surrounding area in the form of air moisture, if the polyurethane foam is wet and the air in the surrounding area is dry. The polyurethane foam is in equilibrium with the ambient humidity.

In accordance with a further embodiment, particles are embedded into the polyurethane foam.

The particles preferably have a greater density than the polyurethane foam itself. This means that the particles act as mass points in the polyurethane foam. With the aid of the particles, the loss factor of the polyurethane foam can be adapted and optimized in wide ranges.

In accordance with a further embodiment, structural parts of the household appliance are arranged in the insulation element.

The structural parts may have fans, cables, a water reservoir or the like, for example. Preferably, the structural parts are surrounded by the polyurethane foam in full, or at least in sections. This means that it is furthermore possible to dispense with additional fastening elements for fastening or assembling the structural parts. The structural parts may be active structural parts, such as fans for example, or passive structural parts, such as cables for example.

In accordance with a further embodiment, the polyurethane foam damps vibrations generated by the structural parts.

This means that the polyurethane foam is also able to ensure the function of damping vibration or suspending the structural parts.

Further possible implementations of the household appliance also comprise combinations—not explicitly cited—of features or embodiments described above or below in respect of the exemplary embodiments. In this context, the person skilled in the art will also add individual aspects as improvements or enhancements to the respective basic form of the household appliance.

BRIEF DESCRIPTION OF THE DRAWINGS

Further advantageous embodiments and aspects of the household appliance form the subject matter of the subclaims and of the exemplary embodiments of the household appliance that are described below. The household appliance is described in greater detail below using preferred embodiments with reference to the accompanying figures, in which:

DETAILED DESCRIPTION OF EXEMPLARY EMBODIMENTS OF THE PRESENT INVENTION

Figure 1:
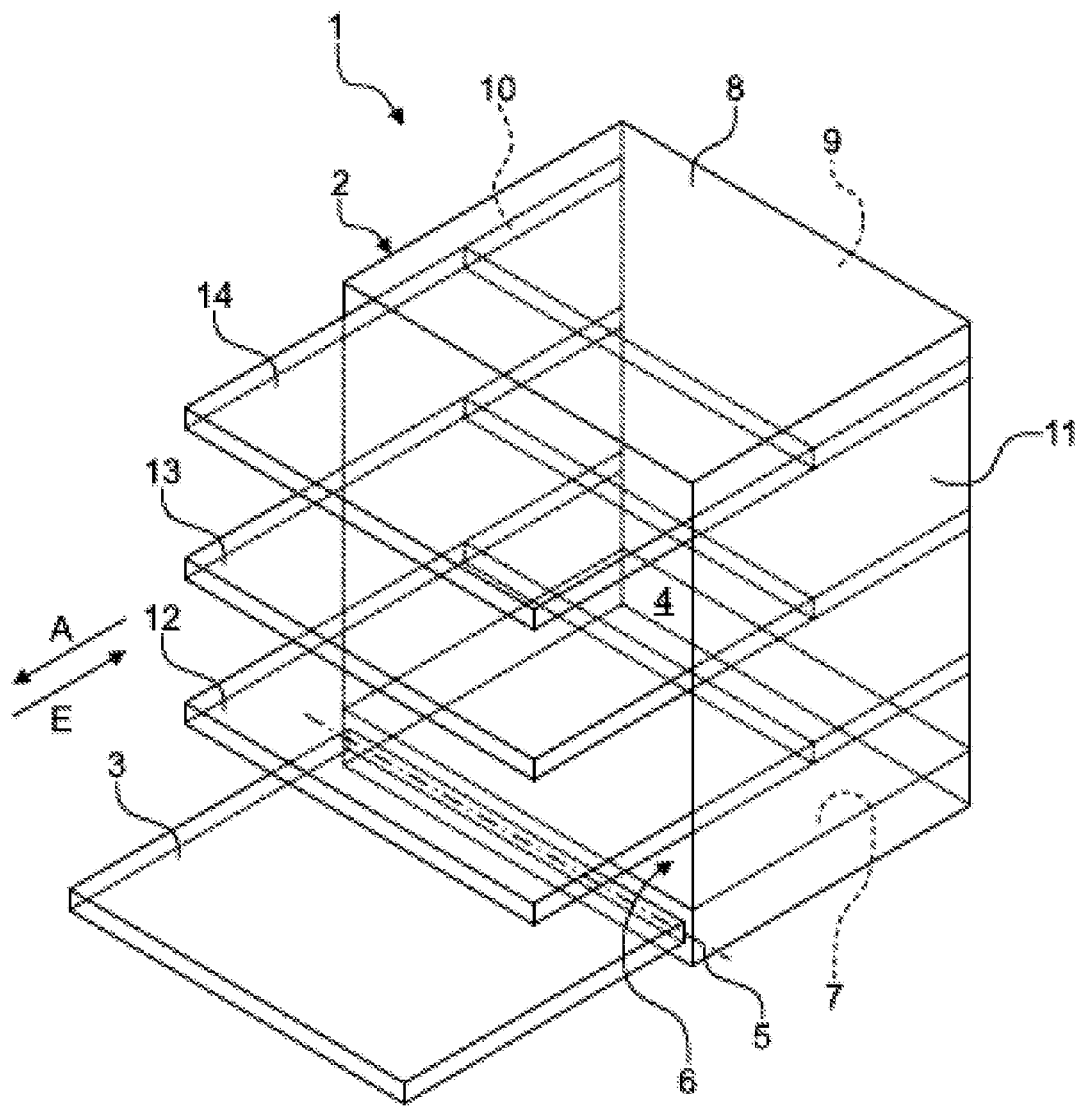
FIG. 1 shows a schematic perspective view of an embodiment of a household appliance.

In the figures, elements that are identical or have the same function are provided with the same reference characters unless specified otherwise.

FIG. 1 shows a schematic perspective view of an embodiment of a household appliance 1. In particular, the household appliance 1 is a water-guiding household appliance, such as a household dishwasher or a household washing machine, for example. The household appliance 1 may also, however, be a refrigerator, a cooker, an oven or the like. Subsequently it will be assumed, however, that the household appliance 1 is a household dishwasher.

The household appliance 1 has a receiving region 2, which can be closed off via a door 3, in particular in a water-tight manner. A sealing facility may be provided for this purpose between the door 3 and the receiving region 2. The receiving region 2 is preferably cuboid in shape. The receiving region 2 may be a dishwasher cavity. The receiving region 2 may be arranged in a housing of the household appliance 1. The receiving region 2 and the door 3 may form a dishwasher interior 4 for washing items to be washed.

The door 3 is shown in its opened position in FIG. 1. The door 3 can be closed or opened by pivoting about a pivot axis 5 provided at a lower end of the door 3. A loading opening 6 of the receiving region 2 can be closed or opened with the aid of the door 3. The receiving region 2 has a base 7, a ceiling 8 arranged opposite the base 7, a rear wall 9 arranged opposite the closed door 3, and two side walls 10, 11 arranged opposite one another. The base 7, the ceiling 8, the rear wall 9 and the side walls 10, 11 can be manufactured from a stainless-steel sheet, for example. Alternatively, the base 7 may be manufactured from a plastic material, for example.

Furthermore, the household appliance 1 has at least one receptacle for items to be washed 12 to 14. A number of, for example three, receptacles for items to be washed 12 to 14 can preferably be provided, wherein the receptacle for items to be washed 12 can be a lower receptacle for items to be washed or a bottom basket, the receptacle for items to be washed 13 can be an upper receptacle for items to be washed or an upper basket, and the receptacle for items to be washed 14 can be a cutlery drawer. As additionally shown in FIG. 1, the receptacles for items to be washed 12 to 14 are arranged one above the other in the receiving region 2. Each receptacle for items to be washed 12 to 14 is optionally able to be shifted into or out of the receiving region 2. In particular, each receptacle for items to be washed 12 to 14 can be inserted or moved into the receiving region 2 in an insertion direction E (arrow) and extracted or moved out from the receiving region 2 against the insertion direction E (arrow) in an extraction direction A (arrow).

Figure 2:
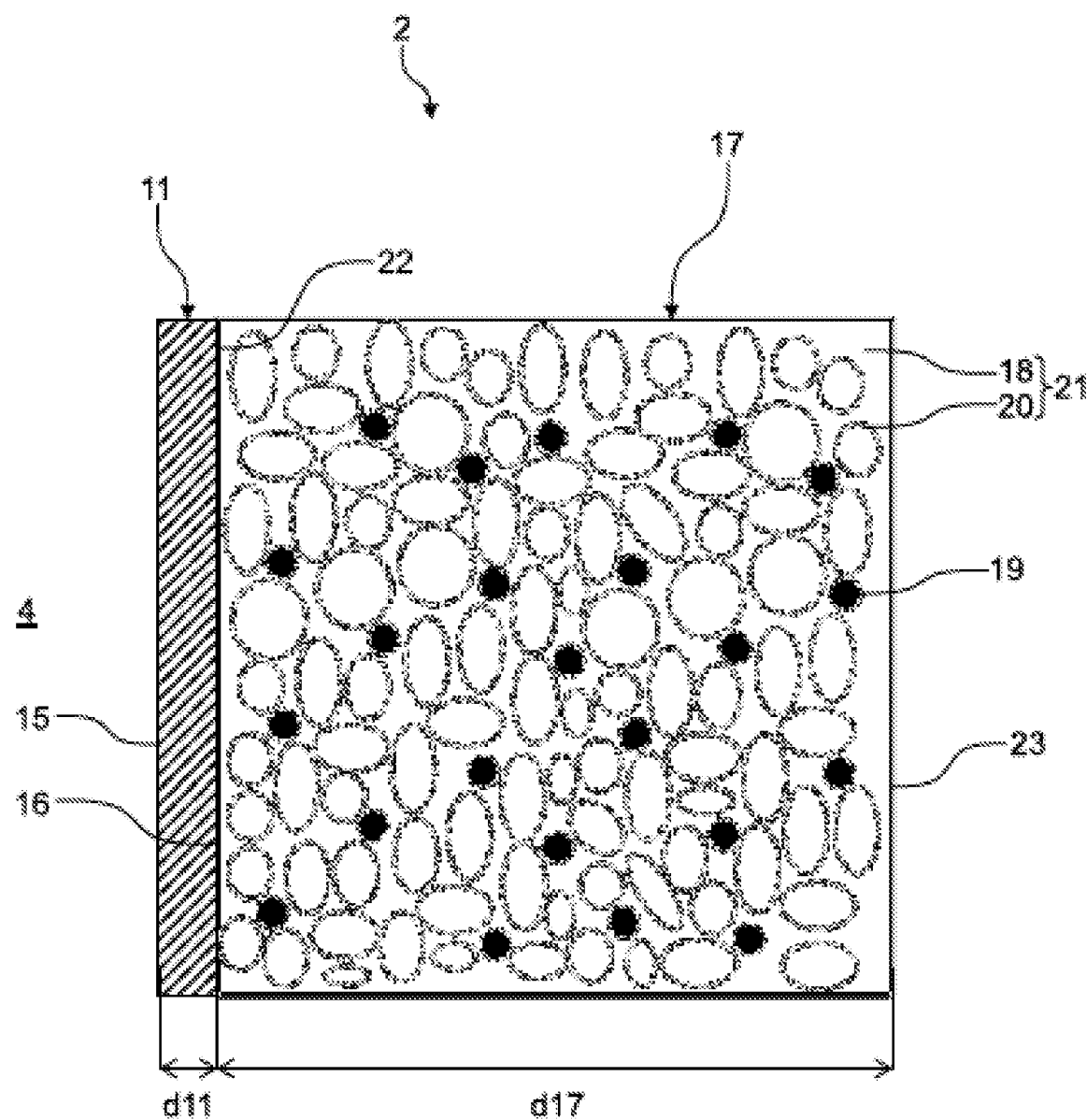
FIG. 2 shows a significantly enlarged schematic sectional view of an embodiment of a receiving region for the household appliance in accordance with FIG. 1.

FIG. 2 shows a significantly enlarged schematic sectional view of an embodiment of the receiving region 2. In particular, only a cut-out of the side wall 11 is shown in FIG. 2. As already mentioned, the side wall 11 may be manufactured from a stainless steel sheet, for example. The side wall 11 comprises an inner side 15 facing toward the dishwasher interior 4 as well as an outer side 16 facing away from the dishwasher interior 4. The inner side 15 and the outer side 16 are placed in parallel with one another. The side wall 11 has a thickness d11. The thickness d11 may amount to 0.2 to 1 mm, for example.

The household appliance 1 comprises an insulation element 17 attached to the receiving region 2 for the acoustic damping or insulation of the receiving region 2. The insulation element 17 may also be referred to as damping element. The insulation element 17 also has thermal damping properties or thermal insulation properties. The insulation element 17 may envelop the receiving region 2. This means that the insulation element 17 may be provided on the base 7, on the ceiling 8, on the side walls 10, 11 and/or on the door 3. Alternatively, the insulation element 17 may also, for example, only be provided on the side walls 10, 11 or only on the side walls 10, 11 and on the rear wall 9. A plurality of insulation elements 17 may be provided. For example, each side wall 10, 11 can be assigned an insulation element 17 of this kind in each case.

The insulation element 17 is provided on the outside of the receiving region 2, facing away from the dishwasher interior 4. In particular, the insulation element 17 is attached to the outer side 16 of the side wall 11, as shown in FIG. 2. The insulation element 17 may be fused or adhesively bonded to the outer side 16, for example. The insulation element 17 may also only be applied to the outer side 16, or pressed against it. The insulation element 17 has a thickness d17 of preferably more than 2 mm, further preferably of more than 10 mm, further preferably of more than 15 mm. The thickness d17 is therefore preferably a multiple greater than the thickness d11.

The insulation element 17 comprises a foamed matrix material 18, in which particles 19 are embedded. In the present case, "foamed" means that a large number of cells or pores 20 are enclosed in the matrix material 18. The pores 20 may be filled with air, for example. The pores 20 may have any given geometry. For example, the pores 20 are in the shape of a sphere or ellipsoid. Together, the matrix material 18 and the pores 20 form a polyurethane foam 21 (PUR foam). A polyurethane can be produced by a mixture of multiple raw components, namely an isocyanate and a polyol. Furthermore, the mixture may also contain a propellant. The isocyanate and the polyol are each liquids. If the propellant is present in the mixture of the isocyanate and the polyol, which leads to outgas sing when the isocyanate reacts with the polyol, the matrix material 18 is foamed up as part of the chemical reaction, whereby the pores 20 occur in the matrix material 18 and the polyurethane foam 21 is formed. The insulation element 17 comprises a surface 22, which is facing toward the outer side 16, and a surface 23, which is facing away from the outer side 16.

The pores 20 are preferably closed. This means that the pores 20 are not connected to one another. The pores 20, however, may also be open or open-pored. In this case, the pores 20 are connected to one another. The matrix material 18 and thus the polyurethane foam 21 may be equipped with the widest range of material properties. The material properties substantially depend upon the chemical constituents of the raw components. The polyurethane foam 21 preferably has viscoelastic properties. In the present case, "viscoelasticity" refers to a partially elastic and partially viscous material behavior. Viscoelastic materials therefore combine the features of solids and liquids.

The polyurethane foam 21 has a thermal conductivity between 20 and 80 mW (m*K), preferably between 40 and 60 mW (m*K), further preferably between 50 and 60 mW (m*K). The polyurethane foam 21 may have a density of less than 300 kg/m$^3$, preferably of less than 250 kg/m$^3$, further preferably of less than 200 kg/m$^3$.

The insulation element 17 is preferably directly foamed onto the receiving region 2, in particular onto the side wall 11. To this end, chemical additives that prevent the insulation element 17 from detaching from the receiving region 2 may be mixed into the matrix material 18. Furthermore, the outer side 16 of the side wall 11 may alternatively or additionally be pretreated, for example roughened, so that the connection between the insulation element 17 and the side wall 11 is not able to detach. Alternatively, the insulation element 17 may also be adhesively bonded to the receiving region 2, fused onto it or even only placed on it or pressed against it.

Due to the insulation element 17 being attached to the receiving region 2 over its entire area, an effective acoustic insulation of the receiving region 2 is ensured. One advantage of completely foaming around the receiving region 2 with the insulation element 17 is that any cracks present are closed off without gaps, whereby once again an improved acoustic insulation is ensured.

The particles 19 are arranged evenly distributed in the matrix material 18. Furthermore, the particles 19 may act as nucleus points for the pores 20. The particles 19 are preferably mixed into the raw components of the matrix material 18 to be mixed. Metals, rocks or other kinds of inorganic materials are eligible as particles 19. Organic materials, such as plastics for example, are also eligible if the density and the modulus of elasticity of the particles 19 are greater than those of the matrix material 18.

Particularly preferably, the particles 19 are graphite particles, in particular expanded graphite particles. The use of expanded graphite particles has the advantage that the particles 19 have intumescent properties in this case. In the present case, "intumescence" is to be understood as meaning an expansion or swelling, i.e. an increase in volume, of the particles 19 without a chemical transformation of the same, when acted upon by heat. This means that, when heat acts upon the insulation element 17, the matrix material 18 is able to disintegrate, while the particles 19 embodied as expanded graphite particles expand or swell up and thus form a carbon foam acting as a heat retardant at or on the receiving region 2.

As already mentioned, the particles 19 have a greater density than the polyurethane foam 21 and than the matrix material 18. The particles 19 may have a density between 500 and 8,000 kg/m$^3$, in particular of 2,200 kg/m$^3$. As already mentioned, the modulus of elasticity of the particles 19 is also greater than the modulus of elasticity of the matrix material 18. The particles 19 preferably have a particle size of less than 500 µm. The particles 19 are present as a powder and, due to their size, are small enough to be evenly distributed in the matrix material 18. The size of the particles 19 is substantially smaller than 500 µm. This means that particles 19 that are larger than 500 µm are also permissible, but it is advantageous if 60% of the particles 19 are smaller than 500 µm. Preferably 80%, in particular 90%, of the particles 19 are smaller than 500 µm. By mixing the particles 19 into the matrix material 18, the pore structure of the polyurethane foam 21 is changed. This means the size, the number and/or the geometry of the pores 20 in the insulation element 17.

To produce the insulation element 17, the particles 19 of one or more of the liquid raw components of the matrix material 18 are added and evenly distributed in the mixture of the raw components. It is also possible to add the particles 19 to the already-mixed raw components, while they are still liquid. Furthermore, different kinds of particles 19 of different substances can be combined. These particles 19 may also have differences in their size distribution and physical properties. If particles 19 of the same or different size, kind and amount are added, a wide range of differently optimized insulation elements 17 can be produced with the very same raw components. This can be used to produce insulation elements 17 for different application purposes at one production plant.

At 40° C. and at a frequency of 100 to 800 Hz, the insulation element 17 has a loss factor of more than 0.2, preferably of more than 0.35, further preferably of more than 0.5. In the present case, the "loss factor" is to be understood as meaning, in the case of physical vibrations that have different natures, the ratio of the imaginary part subject to loss to the loss-free real part of a complex variable. By adding the particles 19 to the matrix material 18, the loss factor of the insulation element 17 can be influenced. Advantageously, this relationship can be used if, as a result, an increase in the loss factor takes place over the entire frequency and temperature range or also if an increase is possible in the frequency and temperature range relevant to this individual case.

Figure 3:
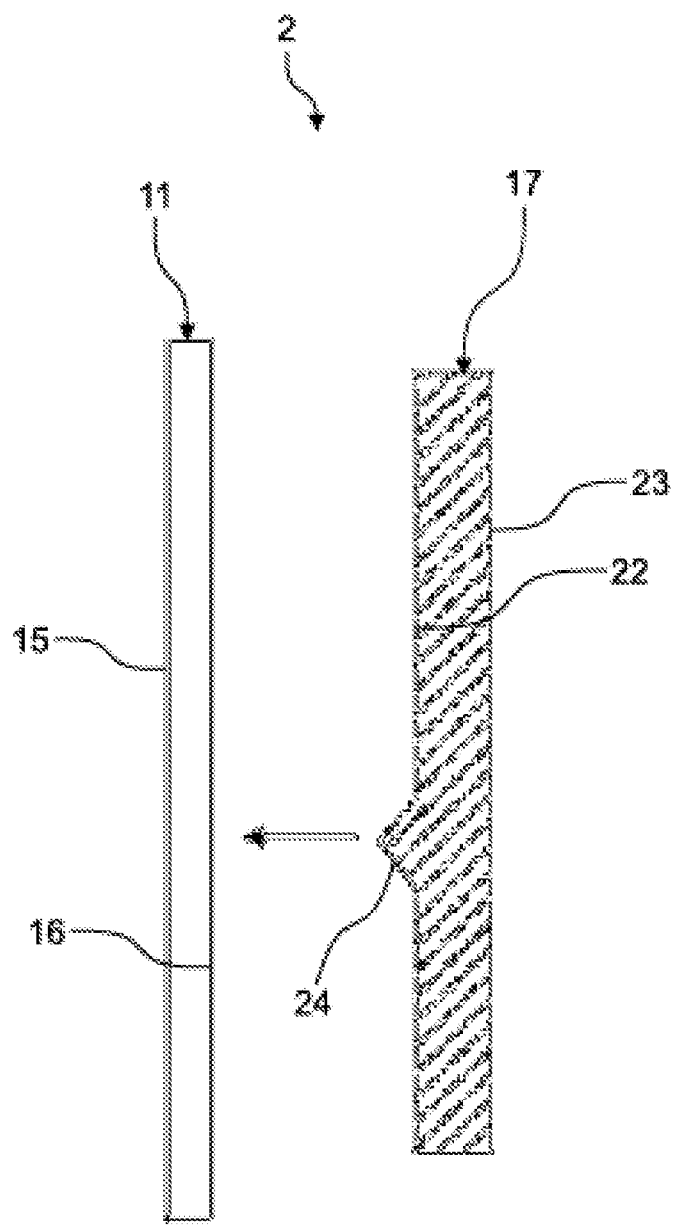
FIG. 3 shows a significantly enlarged schematic sectional view of a further embodiment of a receiving region for the household appliance in accordance with FIG. 1.
Figure 4:
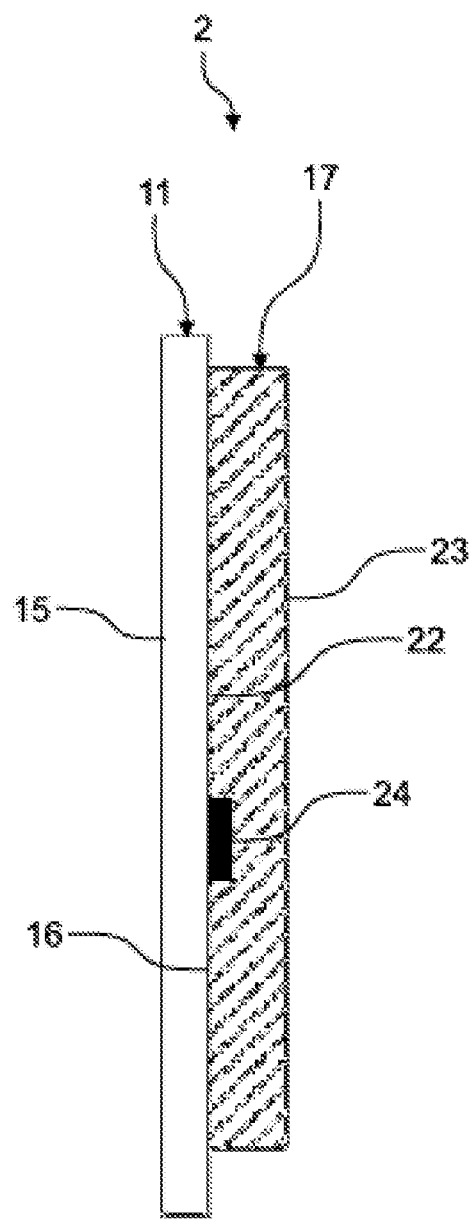
FIG. 4 shows a further significantly enlarged schematic sectional view of the receiving region in accordance with FIG. 2.

FIGS. 3 and 4 each show a schematic partial sectional view of a further embodiment of a receiving region 2. In particular, FIGS. 3 and 4 each show only the side wall 11 of the receiving region 2. As already mentioned, the insulation element 17 comprises the surface 22, which is assigned to the outer side 16 of the side wall 11 and rests against it, as well as the surface 23 facing away from the surface 22. An elastically deformable sealing lip 24 is provided on the surface 22. The sealing lip 24 is formed from the polyurethane foam 21. As shown in FIG. 4, the insulation element 27 is pressed against the side wall 11, in particular against the outer side 16, in such a manner that the sealing lip 24 is elastically deformed. The sealing lip 24 is therefore pressed in or compressed. This means that the insulation element 17 is sealed off in relation to the receiving region 2, in particular in relation to the side wall 11, in a fluid-tight manner. Even if the polyurethane foam 21 contracts, the sealing lip 24 provides enough material that the sealing lip 24 seals off in relation to the receiving region 2 in a fluid-tight manner.

Figure 5:
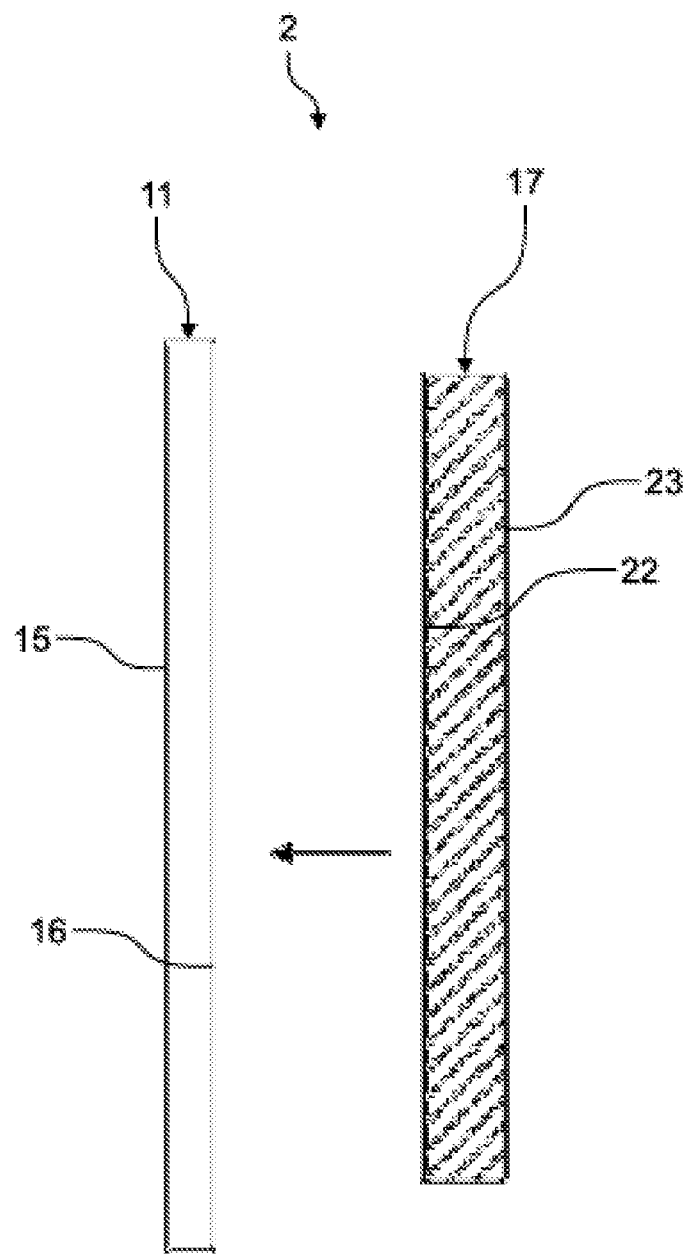
FIG. 5 shows a significantly enlarged schematic sectional view of a further embodiment of a receiving region for the household appliance in accordance with FIG. 1.
Figure 6:
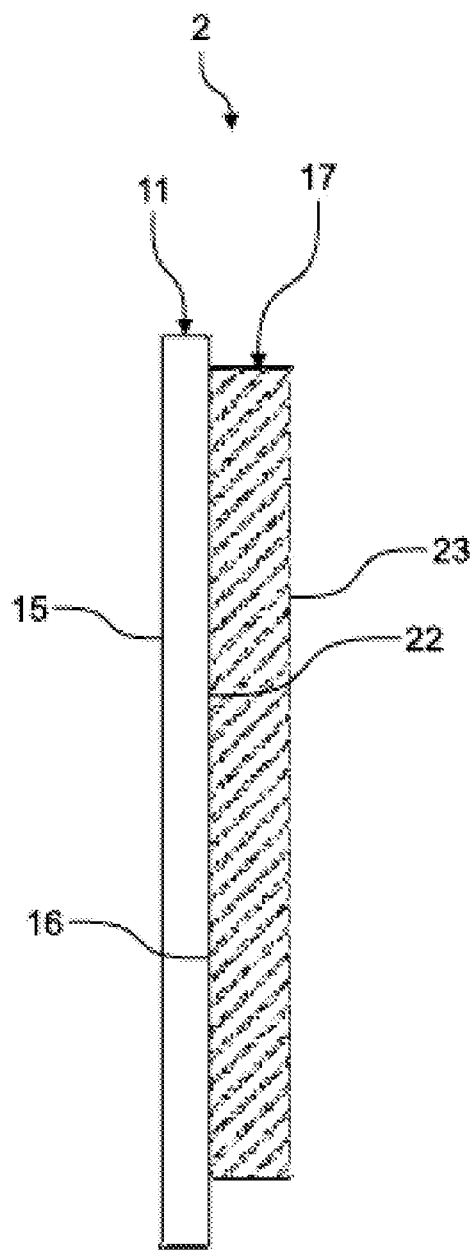
FIG. 6 shows a further significantly enlarged schematic sectional view of the receiving region in accordance with FIG. 5.

FIGS. 5 and 6 each show a schematic partial sectional view of a further embodiment of a receiving region 2. Here too, only the side wall 11 is shown in FIGS. 5 and 6. In this embodiment of the receiving region 2, as opposed to the embodiment of the receiving region 2 in accordance with FIGS. 3 and 4, no sealing lip 24 is provided on the insulation element 17. Instead, the insulation element 17 lies with its surface 22 flat against the outer side 16 of the side wall 11 and seals off in relation to said side wall 11 in a fluid-tight manner.

With the aid of the insulation element 17, the thermal insulation of the receiving region 2 can be improved and/or the sound emission can be reduced. In this context, the insulation element 17, as already mentioned, is formed such that the function of sealing off in relation to water, in particular in relation to water vapor, is integrated into said insulation element 17. In accordance with FIGS. 5 and 6, for example, this may occur with a positive fit over the entire area, or supported by the sealing lip 24 shown in FIGS. 3 and 4. This means that the surface pressure is increased in the region of the sealing lip 24, and if a contracting of the polyurethane foam 21 possibly occurs over the service life of the household appliance 1, a material reserve can be kept available.

The polyurethane foam 21 preferably has hydrophilic properties. This can advantageously be used in order to slow down the transport of water vapor, for example during a rinse cycle. After the end of the rinse cycle, the polyurethane foam 21 can release the moisture absorbed from the water vapor back into the surrounding area in a controlled manner, without there being complications in the household appliance 1. In the event that the polyurethane foam 21 has hydrophilic properties, it is in particular open-pored. As a result, the polyurethane foam 21 is able to absorb a particularly large amount of moisture or water vapor.

FIGS. 7 to 12 show, in a step-by-step manner, the production of a further embodiment of an insulation element 17 and the assembly of the same on the receiving region 2. In this context, the polyurethane foam 21 is used to affix structural parts 25, 26 and enclose them at least partially in itself. The structural parts 25, 26 may be active structural parts or passive structural parts. One example of an active structural part is a fan. One example of a passive structural part may be a cable. In particular, the structural parts 25, 26 may comprise water-guiding structural parts, air-guiding structural parts, water reservoirs, plastic parts for introducing force into the receiving region 2, a fan, a motor, a spring, a cord, electrical lines or components, a non-woven material, a mat, a plastic structural part, foam structural parts, bitumen or the like.

Figure 7:
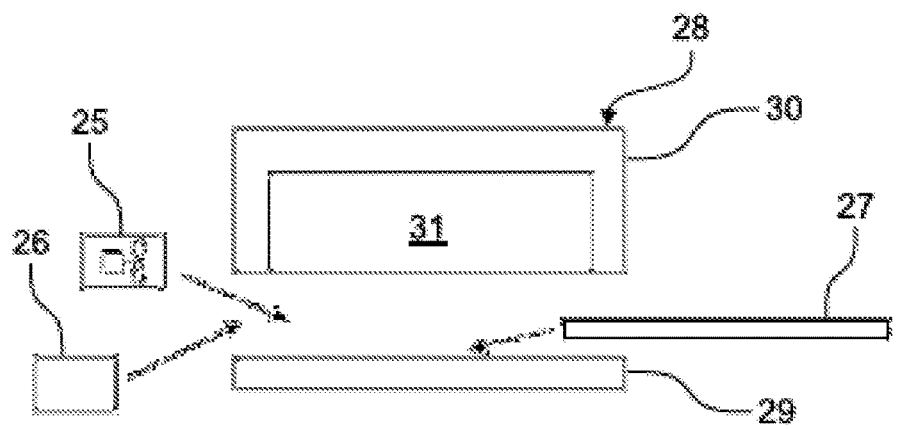
FIG. 7 shows a schematic sectional view of an embodiment of a mold for producing an insulation element for the receiving region in accordance with FIG. 2.
Figure 8:
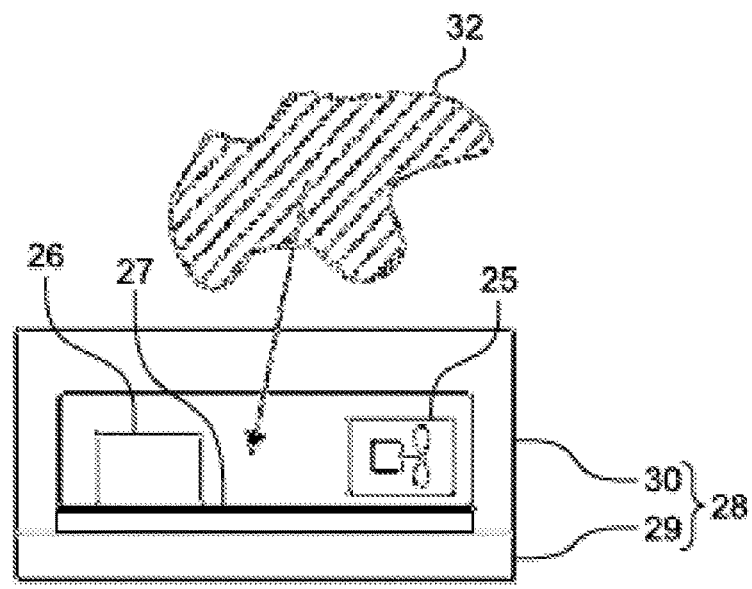
FIG. 8 shows a further schematic sectional view of the mold in accordance with FIG. 7.
Figure 9:
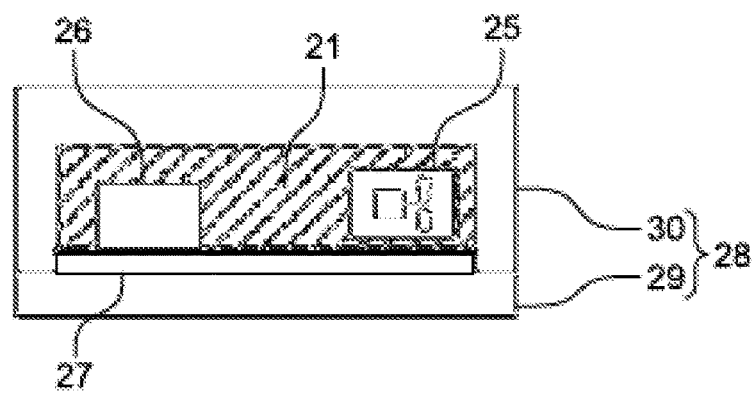
FIG. 9 shows a further schematic sectional view of the mold in accordance with FIG. 7.

In order to produce the insulation element 17, first a reinforcement element 27, for example a bitumen mat, and the structural parts 25, 26 are inserted into a mold 28, in particular a pouring mold or casting mold, which has a mold lower part 29 and a mold upper part 30 (FIG. 7). After inserting the reinforcement element 27 as well as the structural parts 25, 26 into a cavity 31 of the mold 28, a mixture 32 of the raw components of the polyurethane foam 21 is introduced into the mold 28 (FIG. 8). The mixture 32 is then able to chemically react under atmospheric pressure or under a vacuum, and in doing so foam up and fill up the cavity 31 entirely with the polyurethane foam 21 (FIG. 9). In this context, the polyurethane foam 21 surrounds the structural parts 25, 26 either fully or, as in the case of structural part 26, at least in sections. The structural part 25, during the foaming of the same with the mixture 32 in the cavity 31, may for example be held in position with the aid of rods or wires. The structural part 26 may be placed on the reinforcement element 27 or on the mold lower part 29 for positioning purposes.

Figure 10:
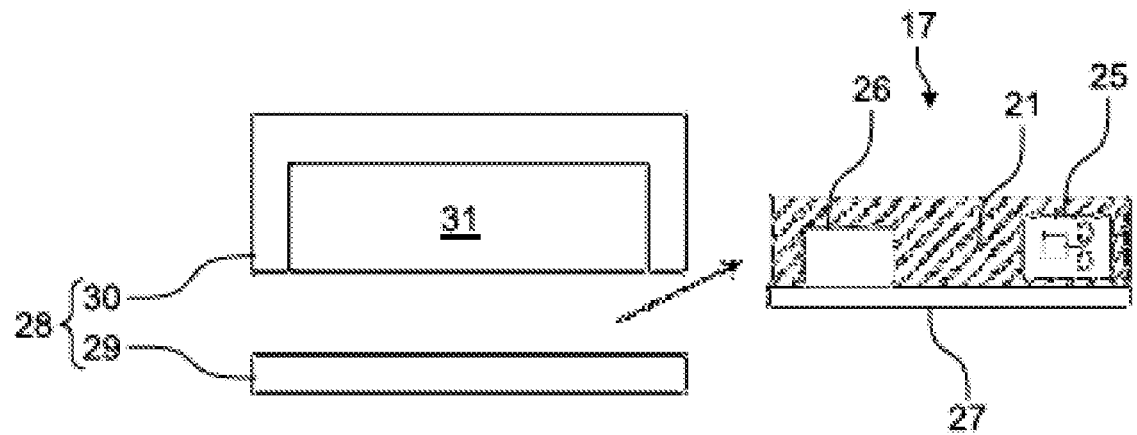
FIG. 10 shows a further schematic sectional view of the mold in accordance with FIG. 7.
Figure 11:
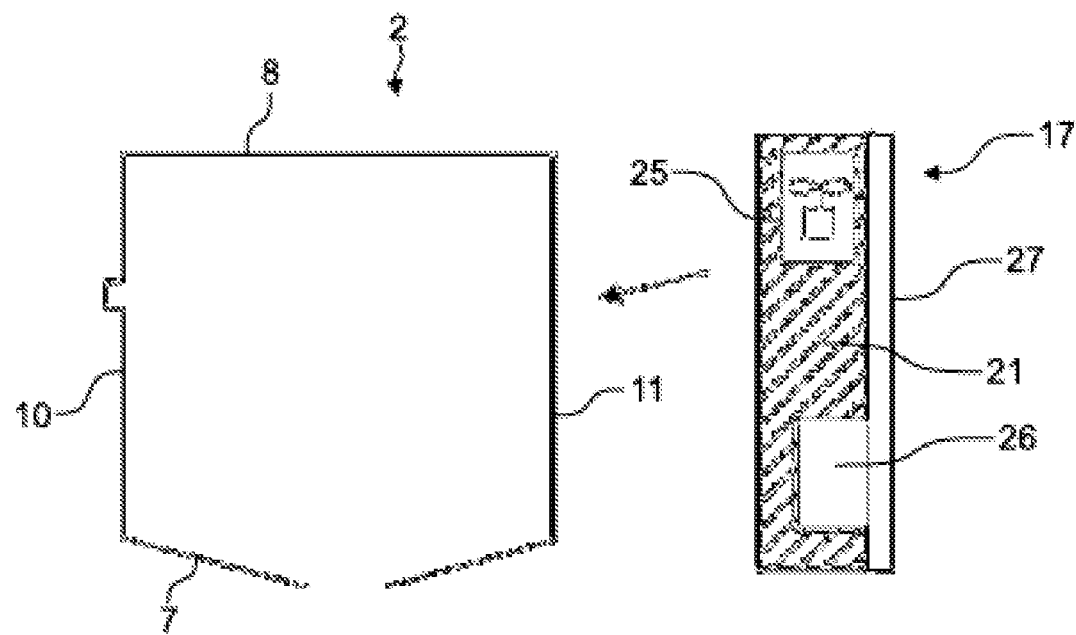
FIG. 11 shows a schematic sectional view of a further embodiment of a receiving region for the household appliance in accordance with FIG. 1.
Figure 12:
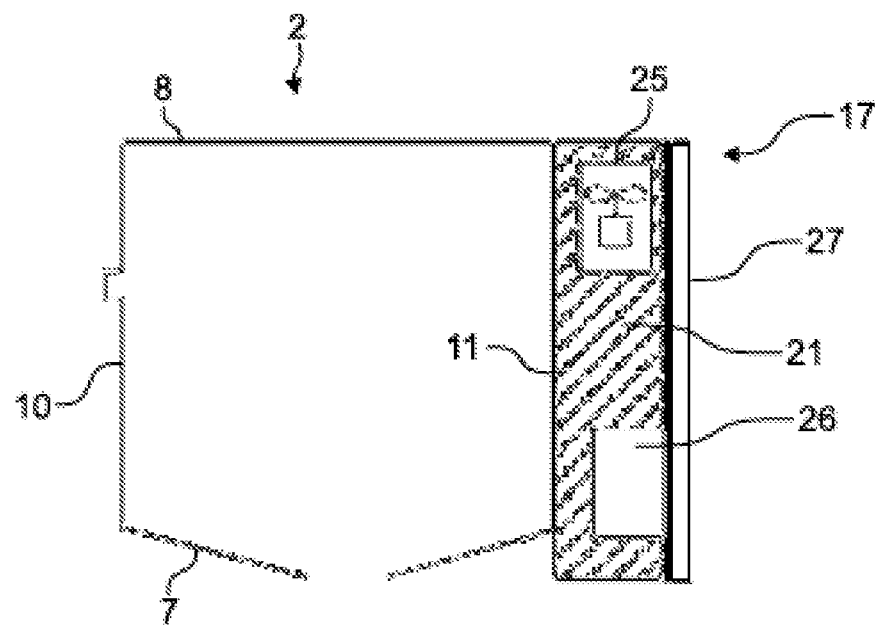
FIG. 12 shows a further schematic sectional view of the receiving region in accordance with FIG. 11.

After the polyurethane foam 21 has fully set and/or cured, the mold 28, as shown in FIG. 10, is opened and the insulation element 17 is demolded. Subsequently, the insulation element 17, as shown in FIGS. 11 and 12, is attached to the outside of the receiving region 2. To this end, for example, the insulation element 17 is pressed against the receiving region 2 in such a manner that a fluid-tight connection is produced between the insulation element and the receiving region 2.

In order to be able to affix the structural parts 25, 26, the properties of the polyurethane foam 21 as an adhesive may be used to hold the structural parts 25, 26 in place, without carrying out additional measures. If the structural parts 25, 26 involve active components, such as fans for example, then these are simultaneously also vibration-damped through the use of the viscoelastic polyurethane foam 21. As a result, it is further possible for other connection elements, such as screws, clips or the like, to be replaced. Above all, large-area structural parts are particularly suitable for this purpose. Due to the large area, a high holding force of the adhesive connection is produced for the basic design of the receiving region 2. If the polyurethane foam 21 has a large volume and is used as a connecting element between different components in the household appliance 1, then this may offer advantages for the case of transport. Particularly at cold temperatures, the rigidity of the polyurethane foam 21 increases and offers effective properties with regard to shock absorption.

Figure 13:
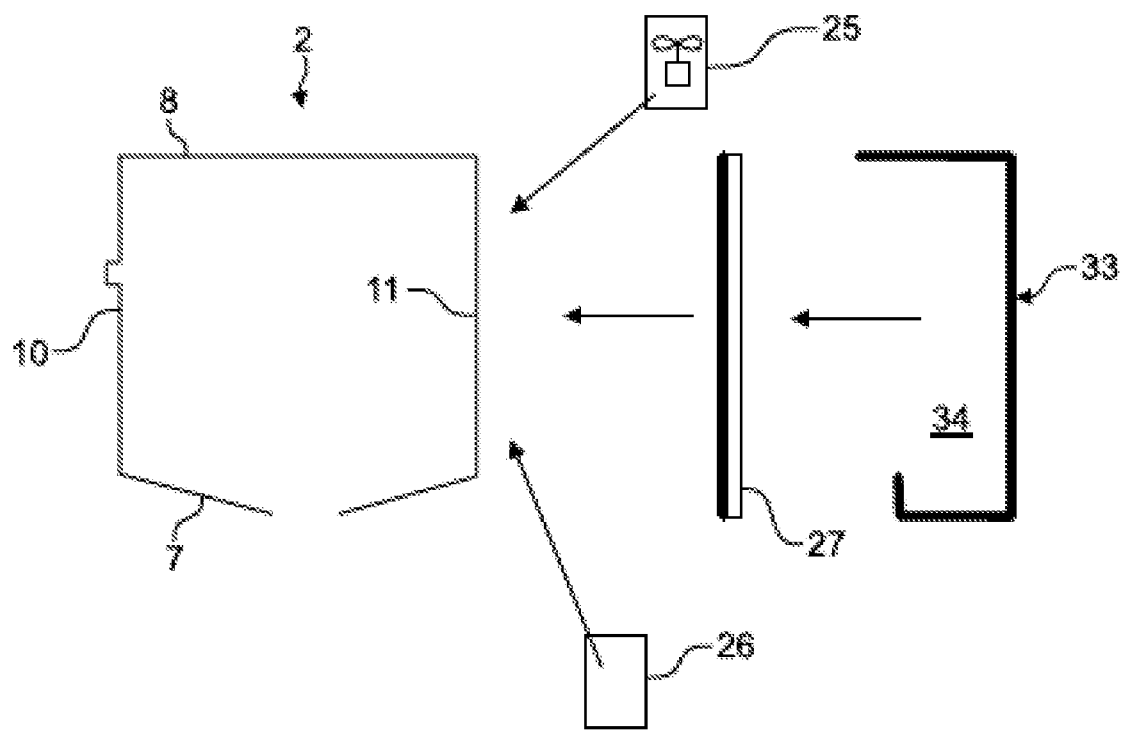
FIG. 13 shows a schematic sectional view of a further embodiment of a receiving region for the household appliance in accordance with FIG. 1.
Figure 14:
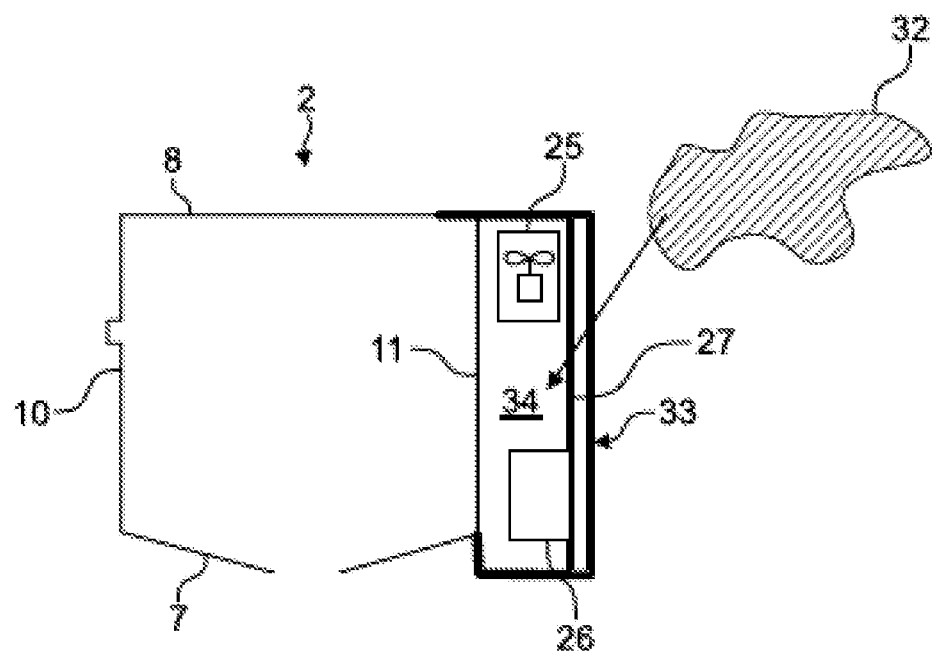
FIG. 14 shows a further schematic sectional view of the receiving region in accordance with FIG. 13.
Figure 15:
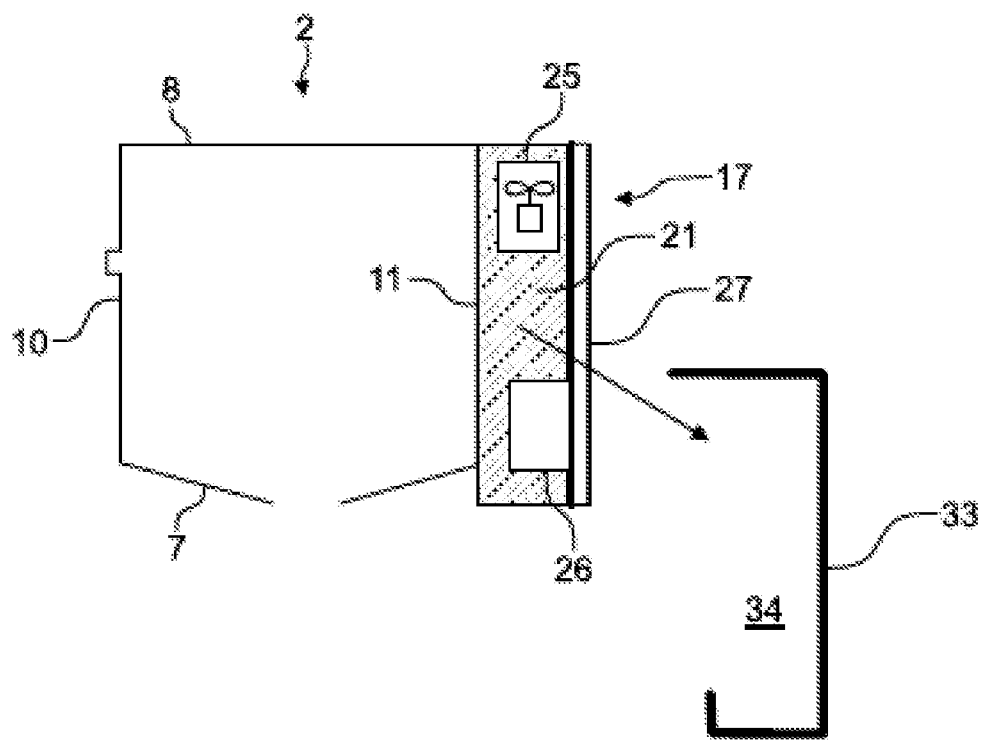
FIG. 15 shows a further schematic sectional view of the receiving region in accordance with FIG. 13.

FIGS. 13 to 15 show an alternative approach for producing the insulation element 17. To this end, the optional reinforcement element 27 as well as the structural parts 25, 26 are attached to the receiving region 2, in particular to the side wall 11, with the aid of a mold 33, which can be fastened directly to the receiving region 2. The mold 33 has a cavity 34 which, after the mold 33 has been attached to the receiving region 2, is filled with the previously mentioned mixture 32 of the raw components of the polyurethane foam 21 (FIG. 14). Subsequently, the polyurethane foam 21 sets and/or cures, and the mold 33, as shown in FIG. 15, can be removed from the receiving region 2 once more and can be used again.

By integrating the function of the sealing in relation to steam with the aid of the sealing lip 24, it is possible to achieve a saving of further structural parts with the aid of the use of the insulation element 17. By advantageously using the hydrophilic properties of the polyurethane foam 21, it is possible to ensure a targeted absorption of water vapor and subsequent releasing of air moisture to the surrounding area. By integrating the structural parts 25, 26 into the insulation element 17, it is possible to dispense with an additional affixing of the structural parts 25, 26. These are also mounted in the polyurethane foam 21 in a damping manner.

Although the present invention has been described with reference to exemplary embodiments, it can be modified in numerous different ways.

The invention claimed is:

1. A household appliance, comprising:
a receiving region; and
an insulation element attached to the receiving region for at least one of acoustic or thermal insulation of the receiving region, said insulation element being manufactured from a viscoelastic polyurethane foam and pressed against the receiving region in such a manner that the insulation element is sealed off in relation to the receiving region in a fluid-tight manner, wherein the insulation element includes an elastically deformable sealing lip sealably pressed against the receiving region to seal off the insulation element in relation to the receiving region in a fluid-tight manner.

2. The household appliance of claim 1, constructed in a form of a water-guiding household appliance.

3. The household appliance of claim 1, wherein the viscoelastic polyurethane foam has a density of less than 300 kg/m$^3$.

4. The household appliance of claim 1, wherein the viscoelastic polyurethane foam has a density of less than 250 kg/m$^3$.

5. The household appliance of claim 1, wherein the viscoelastic polyurethane foam has a density of less than 200 kg/m$^3$.

6. The household appliance of claim 1, wherein the viscoelastic polyurethane foam is hydrophilic.

7. The household appliance of claim 1, wherein the viscoelastic polyurethane foam absorbs water during a program sequence of the household appliance and releases the water toward an end of the program sequence.

8. The household appliance of claim 1, further comprising particles embedded into the viscoelastic polyurethane foam.

9. The household appliance of claim 1, further comprising structural parts arranged in the insulation element.

10. The household appliance of claim 9, wherein the viscoelastic polyurethane foam damps vibrations generated by the structural parts.

* * * * *